May 24, 1949.  N. D. STANLEY, SR  2,471,127
MAP AND KEY HOLDER
Filed May 27, 1947
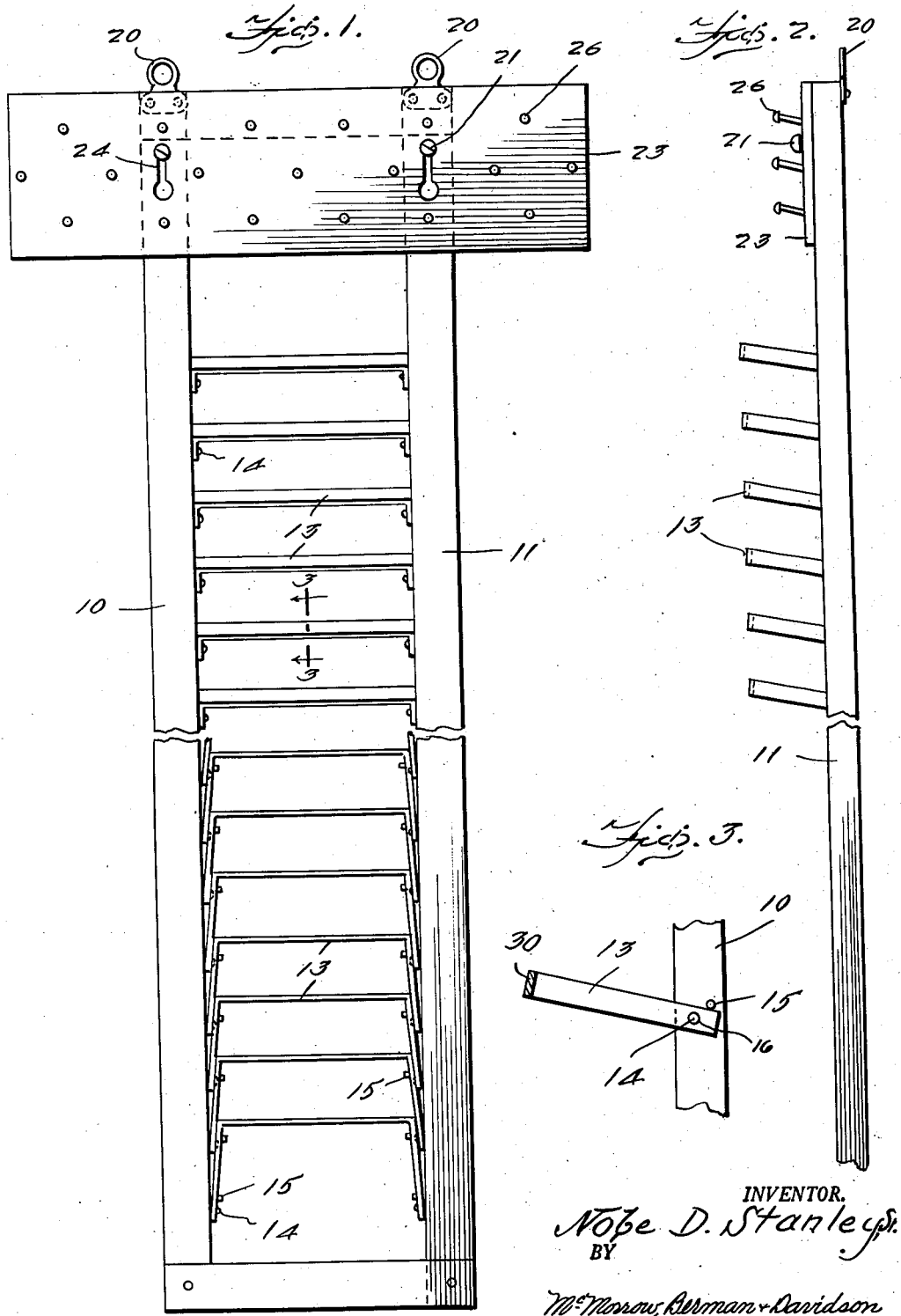
INVENTOR.
Nobe D. Stanley Sr.
BY
McMorrow, Berman & Davidson
ATTORNEYS Patented May 24, 1949

2,471,127

UNITED STATES PATENT OFFICE 2,471,127

MAP AND KEY HOLDER

Nobe D. Stanley, Sr., Fayetteville, N. C.

Application May 27, 1947, Serial No. 750,792

2 Claims. (Cl. 211—104)

This invention relates to a holder for maps, papers, and keys, and is particularly designed for real estate offices, where it is important to keep such articles in order.

The invention will be readily understood with the aid of the accompanying drawings, which illustrate a preferred embodiment of the invention. It is understood that modifications may be made within the scope of the appended claims.

Figure 1 represents a front elevation of the new and improved holder.

Figure 2 is a side elevation of the holder of the present invention.

Figure 3 is a vertical section through a portion of the holder, taken along the line 3—3 of Figure 1.

The holder comprises two vertical rails 10 and 11, spaced apart six or eight inches or whatever other distance is considered desirable. A plurality of U-shaped racks 13 are horizontally pivoted to the inside of each rail, so that the base of the U can swing toward the user.

Each rack 13 may be stamped out of sheet metal. The legs may be apertured at 16 at the same time so that a pivot pin 14 may be readily inserted therethrough to pivot the rack 13 to the rails 10 and 11. A stop 15 is secured to the rails 10 and 11 to limit the extent of pivoting movement of the rack 13.

It will be obvious, therefore, that each rack 13 may be pushed upwardly within the rails 10 and 11, or pulled outwardly to almost a horizontal position, as illustrated most clearly in Figure 3 of the drawings.

The base of the U of each rack 13 is converged, so that it may nest between the legs of the rack immediately above it, as indicated in the bottom half of Figure 1.

The top of each rail 10 and 11 contains an eye 20 to permit attachment to a wall or other support.

The upper portion of each rail further contains a screw 21, having its head spaced from the rail, and a keyboard 23 having two keyhole slots 24 is adapted to be removably attached to the rails 10 and 11. The keyboard 23 may have a series of hooks 26 for holding keys or similar small articles.

In use, the device is fastened to a wall by means of the eyes 20. A map, deed, or other document may be inserted between the legs of a rack 13 and held against the wall by the pivotal placement of the base of the rack 13 against the document. Alternately, the document may be clamped between the legs of the rack 13 and either one or both rails 10 and 11. Or the document may be clamped between two racks 13.

On the outer surface 30 of each rack 13 may be affixed a legend or label identifying the document to be held by that rack.

Keys or other articles may be hung from the hooks 26. When it is desired to remove all the keys, for safekeeping or other reason, the entire board 23 may be slipped off the screws 21 and removed.

I claim:

1. A wall rack for supporting folded maps or the like against a wall, said rack comprising a pair of fixedly spaced vertical siderails having means of suspension upon a wall, a plurality of vertically spaced substantially inverted U-shaped rack elements comprising bight portions only slightly shorter than the distance between the inward sides of the siderails and relatively short legs diverging downwardly from the ends of the bight portions and pivoted at points intermediate their ends to the inward sides of said rails, stops projecting inwardly from the inward sides of the siderails at points above and to the rear of the pivotal points of said legs and engageable by said legs below their pivotal points in a predetermined substantially horizontal position of said rack elements preventing downward pivoting of said rack elements beyond such predetermined horizontal position, said rack elements being formed of flat metal strap with the legs thereof frictionally engaging the inner sides of the siderails in a manner to limit free pivoting of said rack elements and enable said rack elements to retain positions imparted thereto between the predetermined horizontal position and a vertical position between said siderails whereby folded maps or the like can be supported by being gripped between two vertically adjacent rack elements or by being gripped between two vertically adjacent rack elements or by being pressed by one or more of said rack elements against the surface of the wall upon which the rack is suspended.

2. A wall rack for supporting folded maps or the like against a wall, said rack comprising a pair of fixedly spaced vertical siderails having means of suspension upon a wall, a plurality of vertically spaced substantially inverted U-shaped rack elements comprising bight portions only slightly shorter than the distance between the inward sides of the siderails and relatively short legs diverging downwardly from the ends of the bight portions and pivoted at points intermediate their ends to the inward sides of said rails, stops projecting inwardly from the inward sides of the siderails at points above and to the rear of the pivotal points of said legs and engageable by said legs below their pivotal points in a predetermined substantially horizontal position of said rack elements preventing downward pivoting of said rack elements beyond such predetermined horizontal position, said rack elements being formed of flat metal strap with the legs thereof frictionally engaging the inner sides of the siderails in a manner to limit free pivoting of said rack elements and enable said rack elements to retain positions imparted thereto between the predetermined horizontal position and a vertical position between said siderails whereby folded maps or the like can be supported by being gripped between two vertically adjacent rack elements or by being pressed by one or more of said rack elements against the surface of the wall upon which the rack is suspended, the bight portions of said rack elements being substantially straight and the divergence of the legs being such that vertically adjacent rack elements can be partially nested in vertical positions thereof between the siderails with their bight portions parallelly spaced to define a holding slot close to the wall surface, through which folded maps or the like can be inserted into frictionally maintained positions between the rack elements and the wall surface.

NOBE D. STANLEY, Sr.

REFERENCES CITED

The following references are of record in the file of this patent:

UNITED STATES PATENTS

| Number | Name | Date |
|---|---|---|
| 739,260 | Hyland | Sept. 15, 1903 |
| 840,512 | Palmer | Jan. 8, 1907 |
| 1,435,183 | Shepherd | Nov. 14, 1922 |
| 1,716,863 | Morris et al. | June 11, 1929 |
| 1,918,708 | Miller | July 18, 1933 |
| 2,347,035 | Douglas | Apr. 18, 1944 |